Sept. 21, 1948.  E. D. WILLIAMS  2,449,920
CONDUIT COUPLING
Filed March 7, 1946
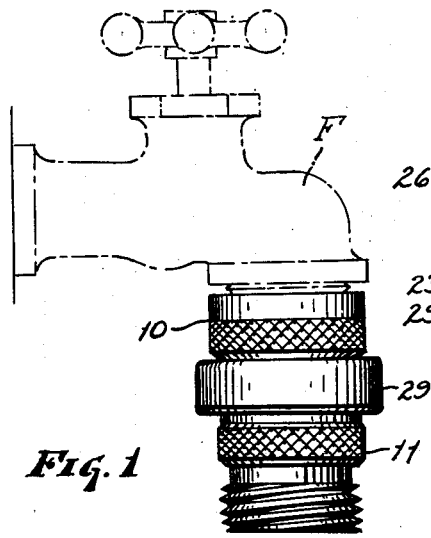
Fig. 1
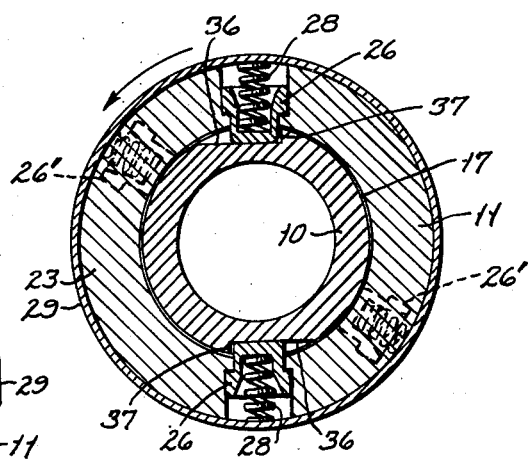
Fig. 4
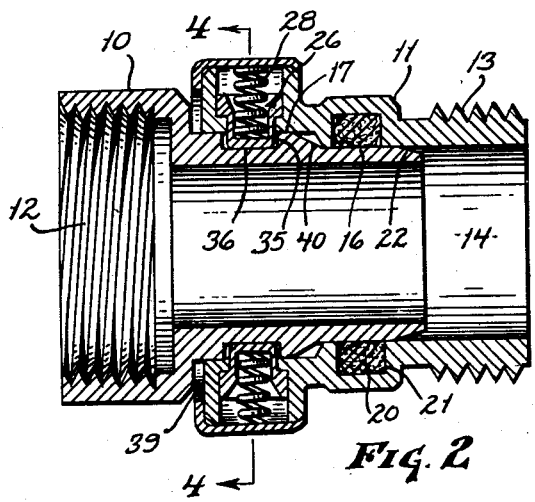
Fig. 2
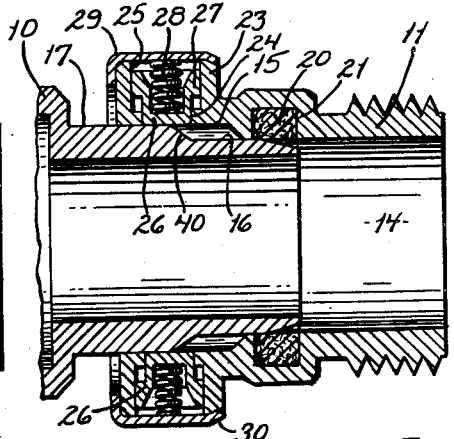
Fig. 3
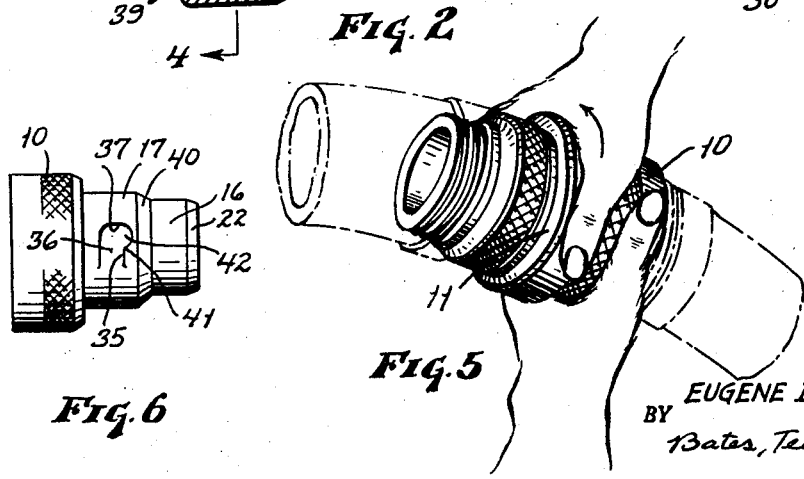
Fig. 6
Fig. 5
INVENTOR.
EUGENE D. WILLIAMS
BY Bates, Teare, & McBean
ATTORNEYS Patented Sept. 21, 1948

2,449,920

UNITED STATES PATENT OFFICE 2,449,920

CONDUIT COUPLING

Eugene D. Williams, Cleveland Heights, Ohio, assignor, by mesne assignments, to Diversified Designing & Machine Products Corporation, Cleveland, Ohio, a corporation of Ohio Application March 7, 1946, Serial No. 652,605

6 Claims. (Cl. 285—169)

This invention relates to conduit coupling devices and particularly to those that are utilizable for effecting a connection for hose couplings and the like.

The present invention has for an object the provision of a connection which is adapted to effect a quick-disconnect coupling for various kinds of liquid conduits, co-axial cables and compressed air lines.

This object is accomplished by providing a female connector with a resiliently mounted detent and a male connector with a novel form of locking shoulder to coact with the detent. The arrangement is such that the male and female members may be telescoped and locked against separation by a simple axial movement, and such that the members may thereafter be manually separated by a partial rotation followed by an axial withdrawal.

Another object is to provide a male coupling member which will not only coact efficiently with the detent but also with a simple form of pressure seal carried by the female member.

These and other advantageous objects will be made apparent by the following specification and claims and by the appended drawings.

In the drawings, Fig. 1 is a side elevational view of a hose connector embodying the locking device of my invention; Fig. 2 is a longitudinal medial section through the coupling; Fig. 3 is a view similar to Fig. 2 but showing the parts in a different relative position; Fig. 4 is a transverse section taken on the plane 4—4 of Fig. 2; Fig. 5 is a perspective view illustrating the operation of separating the coupling; and Fig. 6 is a side elevational view of the male member of the coupling.

In the drawings I have illustrated a preferred form of my invention as embodied in a quick-disconnect coupling for a garden hose or for a similar use. A male member 10 and a female member 11 may be provided with any desired form of connecting means for attaching to their respective conduits. I have shown the male member as provided with internal threads whereby it may be fitted to an ordinary water faucet F, as illustrated in Fig. 1, and I have shown the female member as provided with external threads to receive an ordinary hose connector. The particular form of connecting means, however, is immaterial to the invention.

The female member 11 is formed with a bore 14 and a counterbore at 15. The male member 10 is provided with a cylindrical end portion at 16 having a sliding fit in the bore 14, and with a cylindrical portion 17 of larger diameter having a sliding fit in the counterbore 15. Sufficient longitudinal engagement is thus obtained to provide rigidity of the joint.

A packing ring of suitable material 20 is carried by the female member in a groove 21 communicating with the bore 14. This ring is adapted to press into sealing engagement with the cylindrical surface at 16 when the parts are telescoped together. A beveled end 22 on the male member allows its easy insertion into the seal.

Spring pressed detents are provided in the female member for locking engagement with the male member. While one or any other convenient number of detents may be incorporated, I prefer to use two as shown in the drawings. The detents are preferably formed as spring pressed pins although other forms of resilient detents could be designed, it only being necessary that they be limited to axial movement. In the preferred form illustrated the female member is provided with an enlarged cylindrical head 23 having radial bores 24 which lead into the counterbore 15 and are in turn counterbored at 25 from the periphery of the head. Each detent comprises a sliding cup 26 which projects through the bore 24 and has an enlarged rim 27 slidable in the counterbore 25. A compression spring 28 reacts against the inner bottom of the cup and against a ferrule 29 which is telescoped over the head 23 and is secured in place as by spinning at 30. The spring 28 presses the detent radially inwardly until stopped by engagement of the cup rim with the bottom of the counterbore 25.

Referring now to the depression or locking shoulder of the male member which coacts with the detent just described, it will be noted that I provide a depression of such shape that the detent, when seated in it, is prevented from moving axially of the coupling but may be cammed out upon the cylindrical surface 17 by a relative rotation of the male and female members. The depressions may conveniently be formed by feeding an end mill radially into the surface 17 for a substantial distance to form a shoulder at 35 (Fig. 2) and by then moving the end mill normal to its length so that the bottom 36, of the slot so formed, intersects the cylindrical surface, as best seen in Fig. 4. It will be noted that the bottom 36 of the slot could be extended in both directions. I prefer, however, the form illustrated in the drawings as a stop shoulder 37 is thereby provided for a more positive action of the device.

The detents may either snap into the depressions, just described, or be rotated into them, depending upon the particular angular relationship between the male and the female members when they are telescoped together. A conical portion 40 lies between the cylinder 16 and the cylinder 17. As the members are brought together the detents 26 pass over the cylinder 16, either clearing it or slidably engaging it depending upon the particular dimensions, and then engage the portion 40. The detents are here cammed outwardly, against the action of their springs, onto the cylinder 17, as shown in Fig. 3. The male member is then fully inserted and, on those occasions when the detents are directly in line with the depressions, they snap directly into them to the position shown in Fig. 2, while on other occasions the detents slidably press against the cylindrical surface 17 at a position such as illustrated at 26' in Fig. 4. After the parts are fully telescoped, the female member is given a partial rotation in a right hand direction opposite that of the arrow, in Fig. 4, until the detents are seated against the shoulders 37. The members are then in locked position and inadvertent separation in a longitudinal direction is prevented by the radial shoulder 35 and rotation in one direction is prevented by the shoulder 37 and in the other direction by the resistance of the springs 28 to the camming action of the surface 36.

Resistance to movement of the detents from locking position may be augmented by the provision of a shoulder 41, illustrated in Fig. 6, such as is usual in bayonet locks. Resilient means, not shown, such as a spring washer at the point 39 between the members in Fig. 2, may be employed to urge the detent axially into the region 42 of Fig. 6 and behind the shoulder.

Separation of the illustrated coupling is effected, as shown in Fig. 5, by manually rotating one of the parts upon the other through a small fraction of a revolution and then axially slipping the male member from the female member. Referring to Fig. 4, it will be seen that rotation of the member 11, in the direction of the arrow, will cause the detents 26 to slide up the ramps 36 against the action of the springs until they rest at a position, such as 26', upon the cylindrical surface. Axial withdrawal of the male member then allows the detents to slide down the conical surface or ramp 40 and to regain their fully extended positions.

While I have illustrated a specific embodiment of my invention, it will be apparent that the locking shoulder may arise from, instead of being sunk into, the cylindrical surface. In such case a longitudinally extending ramp before the shoulder allows the detent to rise over it and snap behind it, and separation of the members is effected by rotational movement to bring the detent from behind the shoulder for subsequent longitudinal withdrawal.

These and other changes and modifications may be made within the spirit and scope of my invention, the limits of which I intend to be defined only by the following claims.

I claim:

1. A coupling comprising a pair of round telescoping members, the inner member having a recess leading circumferentially from the round exterior of that member and terminating at the other end in an abrupt shoulder, a radially movable detent carried by the outer member, a spring pressing said detent inwardly, and means for forcing the detent outwardly against the action of the spring as the members are shoved together longitudinally.

2. A conduit coupling comprising a pair of round telescoping tubular members, the inner member having a recess leading circumferentially from the round exterior of that member and terminating at the other end in an abrupt shoulder, said inner member having a conical surface leading outwardly and longitudinally to the top of the recess and to the zone of the inner member circumferentially aligned with the recess, a radially movable detent carried by the outer member, and a spring pressing said detent inwardly into a position to engage said conical surface and thereafter come into the circumferential region of said zone and recess as the members are coupled.

3. A coupling comprising a pair of round telescopic members, the inner member having an external recess, the outer member having an inwardly projecting movable detent adapted to occupy said recess when the members are coupled, the base of the recess being formed to force the detent outwardly when the inner member is given a rotation relative to the outer member, a housing rigidly carried by the outer member, and a spring within the housing bearing at its inner end against the detent.

4. A conduit coupling comprising a pair of round telescopic tubular members, the inner member having an external recess, the outer member having an inwardly projecting detent adapted to occupy said recess when the members are coupled, the base of the recess being formed to force the detent outwardly when the inner member is given a rotation relative to the outer member, a cylindrical housing rigidly carried by the outer member, a coiled spring bearing at its inner end against the detent and at its outer ends against the housing, and means for limiting the inward movement of said detent.

5. A conduit coupling comprising a pair of round telescopic tubular members, the inner member having an external recess, the outer member having an inwardly projecting detent adapted to occupy said recess when the members are coupled, a surrounding housing carried by the outer member, said detent comprising a cup having an outward shoulder to limit the inward movement of the cup, a coiled compression spring seating in the cup with its outer end abutting the inner surface of said housing, and means for automatically forcing the detent outwardly from the recess when the inner member is given a partial rotation within the outer member.

6. A conduit coupling comprising a pair of round telescoping tubular members, the inner member having a recess leading circumferentially from the round exterior of that member and terminating in an abrupt shoulder, said inner member having a conical surface leading outwardly and longitudinally to the top of the recess and to the zone of the inner member circumferentially aligned with the recess, a radially movable cup carried by the outer member and having a shoulder to limit its inward movement, a coiled compression spring seated in the cup, a cylindrical housing carried by the outer member and forming an abutment for the outer end of said spring, whereby said spring presses said detent inwardly into a position to engage said conical surface and thereafter engage said zone of the inner member and eventually come into said recess as the members are coupled.

EUGENE D. WILLIAMS.

REFERENCES CITED

The following references are of record in the file of this patent:

UNITED STATES PATENTS

| Number | Name | Date |
|---|---|---|
| 1,098,265 | James | May 26, 1914 |
| 1,372,297 | Kennedy | Mar. 22, 1921 |
| 1,809,237 | Halborg | June 9, 1931 |